Patented Apr. 3, 1923.

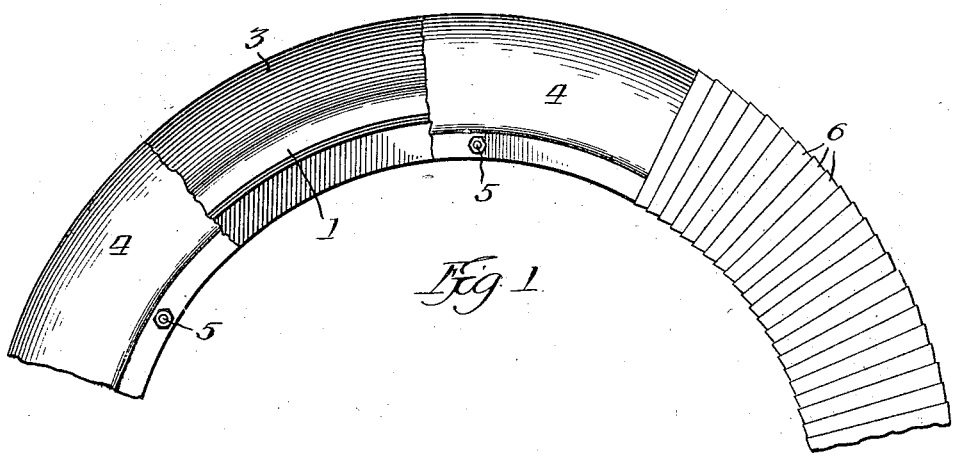
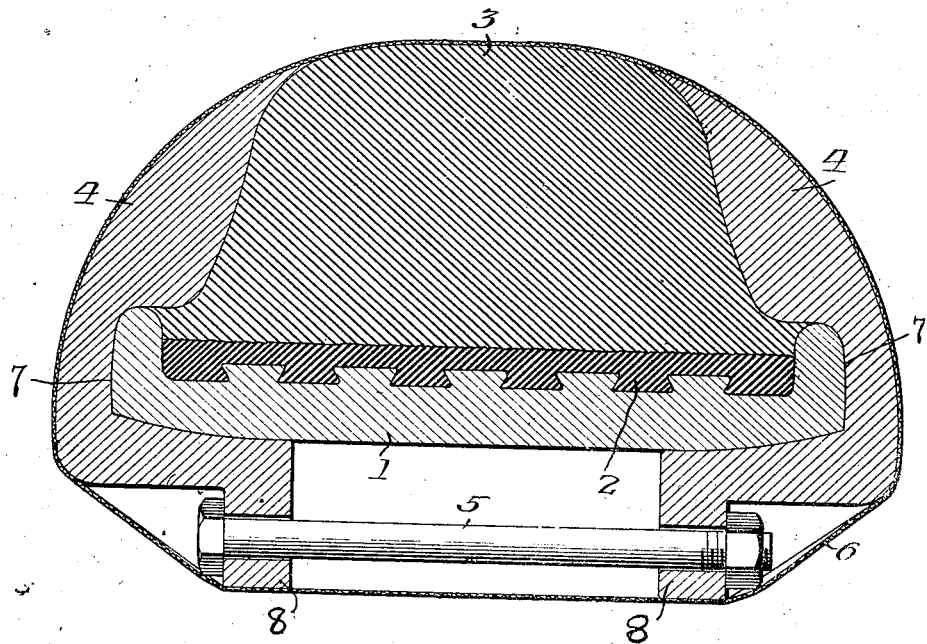

UNITED STATES PATENT OFFICE.

DANIEL E. GOODENBERGER, OF AKRON, OHIO, ASSIGNOR TO THE FIRESTONE TIRE AND RUBBER COMPANY, OF AKRON, OHIO, A CORPORATION OF OHIO.

PROCESS AND APPARATUS FOR THE MANUFACTURE OF SOLID TIRES.

Application filed March 6, 1919. Serial No. 280,984.

*To all whom it may concern:*

Be it known that I, DANIEL E. GOODENBERGER, a citizen of the United States, residing at Akron, in the county of Summit, State of Ohio, have invented certain new and useful Improvements in Processes and Apparatus for the Manufacture of Solid Tires, of which the following is a specification.

This invention relates to a method of manufacturing and curing solid tires, its purpose being to greatly lessen the cost of production of solid tires without impairing their quality.

In the manufacture of solid tires, as practiced at the present time, the equipment is very expensive and a method which enables the tire manufacturers to dispense with any of the expensive apparatus is a great advantage. As far as known to me, all solid tires are now vulcanized in hydraulic presses in large steel or cast iron molds which are very costly, and there is always a considerable overflow in the molds which is lost to the manufacturer. The objects of my invention are to dispense with the use of molds and hydraulic presses for the manufacture of solid tires and to eliminate the loss occurring through the overflow. Other advantages will appear as the description proceeds, and it is understood that changes and modifications may be made within the scope of the invention.

This is accomplished in the manner described herein, the accompanying drawings showing one type of apparatus in which the tires may be cured.

Fig. 1 is a side elevation of a portion of a tire, parts being broken away to show the construction.

Fig. 2 is a cross section through a tire ready to be vulcanized.

This method is adaptable for use in curing solid tires of any type, but is herein shown as applied to tires vulcanized on metallic rims or bases.

In the drawings 1 represents the metallic rim, which may be of any preferred type, 2 the hard base and 3 the soft rubber or tread portion of the tire. The hard base is prepared and applied to the rim in any desirable manner and the tread is then applied to the hard base. The tread may be prepared in any approved manner, it being essential that it be brought very closely to the shape of the finished tire. For this reason, I prefer to use the process of tubing by means of which the tire can be extruded to very closely the shape in which it appears in the final product, and little change in shape is required during vulcanization. It may be possible to manufacture the tread portion of the tire by some other method than tubing and I do not intend to be limited to that step, but the essential feature is that the tread portion of the tire be brought to approximately its finished shape before vulcanization.

After the tire has been assembled, pressure rings 4 are placed at each side of the tire, which may extend on the under side of the rim and be clamped in position by bolts 5 if desired. The configuration of these side rings is clearly shown in Fig. 2. At its outer circumference, the ring is shaped to the side of the tire and the outer side is a continuation of the curvature of the tread of the tire. The inner circumference is recessed as at 7 to receive the edges of the rim which may be in the form of upturned flanges, if desired, although this is not necessary. Each ring provided with an inwardly extending flange or ears 8 to receive the clamping means.

After the side rings have been applied and the clamping devices drawn up to tightly clamp the unit together, the assembly is placed in a wrapping machine and one or more wrappings of cloth 6 are tightly wound about the tire and side rings, and the tire is ready to be vulcanized. This is done in any form of vulcanizer, the heater in common use being suitable.

It will be seen that the costly hydraulic presses in use for curing solid tires are dispensed with by my new method. The loss through the overflow is eliminated. The manufacturer does not require a vast outlay of mould equipment as a single pair of rings may be used for all tires of equal diameters, and the usual heavy molds are not used, not only saving expense thereof, but also the apparatus which is required to handle them.

I am aware of the prior process of curing pneumatic tires by the use of side rings and spiral wrapping, but as far as known to me this process has never been extended to the curing of solid tires.

The apparatus shown and the method described are subject to alteration as the details shown are immaterial. Such changes and modifications are within the scope of this invention and are intended to be covered herein.

I claim:

1. The method of manufacturing solid tires, comprising applying to a rim a layer of hard rubber composition, forming the tread portion of the tire from a resilient rubber compound in approximately the shape of the finished tire, applying the tread portion to the hard rubber base, confining the sides of the tire and the edges of the rim between metallic rings, wrapping the rim, tire and side rings with a spiral cloth wrapping and vulcanizing.

2. The method of manufacturing solid tires comprising, effecting an unyielding pressure simultaneously against both sides of the tire to compress it in a lateral direction, subjecting the tread portion of the tire to a yielding pressure to compress it in a radial direction, and vulcanizing the tire in its compressed condition.

3. Apparatus for use in the manufacture of solid tires comprising, oppositely disposed annular members of lesser diameter than the tire adapted for relative adjustment to compress the tire in a lateral direction while permitting free expansion of its tread portion, and a flexible sheath adapted for adjustment to compress the tread portion of the tire.

DANIEL E. GOODENBERGER.